D. B. ROHRER.
COMBINED PLOW AND HARROW.
APPLICATION FILED MAR. 26, 1913.
1,076,520.
Patented Oct. 21, 1913.
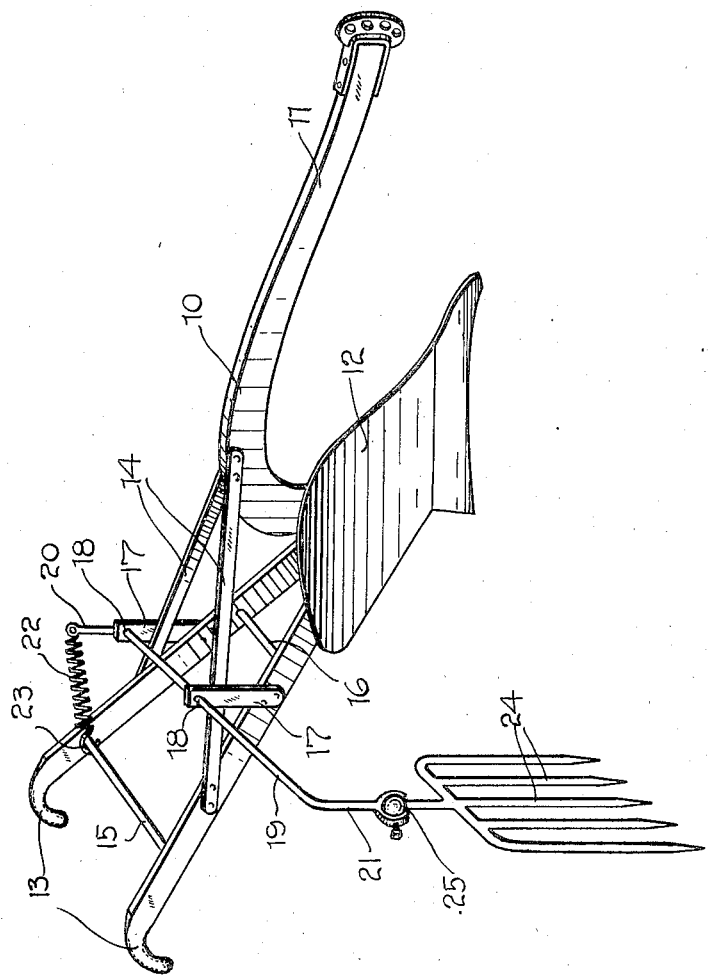
Inventor
D. B. Rohrer
Witnesses
Robert M. Sutphen.
A. J. Hind.
By Watson E. Coleman
Attorney

UNITED STATES PATENT OFFICE.

DARIUS B. ROHRER, OF FAIRBANKS, TEXAS.

COMBINED PLOW AND HARROW.

1,076,520.   Specification of Letters Patent.   Patented Oct. 21, 1913.

Application filed March 26, 1913. Serial No. 756,956.

*To all whom it may concern:*

Be it known that I, DARIUS B. ROHRER, a citizen of the United States, residing at Fairbanks, in the county of Harris and State of Texas, have invented certain new and useful Improvements in Combined Plows and Harrows, of which the following is a specification, reference being had to the accompanying drawings.

This invention relates to new and useful improvements in agricultural implements and more particularly to a combined plow and harrow.

An object of this invention is the provision of a combined plow and harrow, which operates to break up the earth after it has been plowed, while the plow is opening another furrow.

Another object of this invention is the provision of a harrow attachment which can be very readily applied to or removed from a plow of any preferred type.

A further object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawing, in which the figure is a perspective view of a plow having my invention applied thereto.

Referring to the accompanying drawing, the numeral 10 designates generally a plow which comprises the customary curved beam 11, which supports the plow share 12.

Handles 13 are secured to the lower curved portion of the plow beam 11 and are further connected thereto by the braces 14. These handles are held rigid relative to each other by the transverse bars 15 and 16. A pair of vertical standards 17 are secured to the outer faces of the handles 13 and project upwardly therefrom. These standards 17 are formed in their upper ends with alining bearings 18 in which is journaled a transverse rock shaft 19 formed at one end with an upwardly inclined arm 20 and at its opposite end with a downwardly inclined arm 21. A spring 22 is connected at one end to the arm 20, and at its opposite end to a hook 23, which engages the bar 15 for yieldingly holding the rod 19 against displacement. A harrow 24 is attached to the lower end of the arm 21 and is made adjustable thereon by means of the swivel joint 25. The shaft 19 extends beyond one side of the plow 10 and supports the harrow 24 in spaced relation upon one side of the shaft 12.

Obviously, when the plow is being used, the harrow 24 will operate to loosen the earth in the furrows which have been previously plowed upon the opening of an additional furrow. Owing to the arrangement of the spring 22 and its connection between the shaft 19 and bar 15, the harrow will be yieldingly supported so that injury will be prevented in case the same contacts with an undesired hard foreign object.

It should be understood in this connection that various minor changes in the specific details of construction can be resorted to within the scope of the appended claims without departing from or sacrificing any of the advantages of the invention.

From the foregoing disclosures taken in connection with the accompanying drawings, it will be manifest that a combined plow and harrow is provided, which will fulfil all of the necessary requirements of such a device.

Having thus fully described this invention, what I claim as new and desire to secure by Letters Patent is:—

1. The combination with a plow, of a transversely extending rock shaft connected thereto, a spring connecting one end of said shaft with the plow, and a harrow adjustably connected to the other end of said shaft, as and for the purpose described.

2. The combination with a plow, of a transversely extending rock shaft connected thereto, one end of said shaft being bent upwardly, and the opposite end of said shaft being bent downwardly, a spring connecting the upwardly bent end of said shaft with the plow, and a harrow adjustably connected to the downwardly bent end of said shaft, as and for the purpose described.

3. The combination with a plow having rearwardly extending handles, of vertical standards projecting from said handles, a transverse shaft journaled in said standards, means connecting one end of said shaft with said plow for yieldingly holding said shaft in one position, and a harrow adjustably connected to the other end of said shaft, as and for the purpose described.

4. The combination with a plow, of standards secured thereto, a shaft journaled in said standards, arms formed upon the opposite ends of the shaft, a spring connecting one arm with the plow and a harrow adjustable upon the other arm.

In testimony whereof I hereunto affix my signature in the presence of two witnesses.

DARIUS B. ROHRER.

Witnesses:
A. M. SINGER,
H. S. MATZKE.